US012749375B2

(12) United States Patent
Jones et al.

(10) Patent No.: US 12,749,375 B2
(45) **Date of Patent: *Sep. 29, 2026**

(54) METHODS AND SYSTEMS FOR TOKENIZATION OF MUSIC LISTENING

(71) Applicants: Khalid Reede Jones, West Hollywood, CA (US); Shannon Diane Smith, Nashville, TN (US)

(72) Inventors: Khalid Reede Jones, West Hollywood, CA (US); Shannon Diane Smith, Nashville, TN (US)

( * ) Notice: Subject to any disclaimer, the term of this patent is extended or adjusted under 35 U.S.C. 154(b) by 341 days.

This patent is subject to a terminal disclaimer.

(21) Appl. No.: 18/465,790

(22) Filed: Sep. 12, 2023

(65) Prior Publication Data

US 2024/0078872 A1 Mar. 7, 2024

Related U.S. Application Data

(63) Continuation of application No. 16/882,032, filed on May 22, 2020, now Pat. No. 11,810,425.
(Continued)

(51) Int. Cl.
*G07F 17/32* (2006.01)
*A63F 3/06* (2006.01)
(Continued)

(52) U.S. Cl.
CPC ........ *G07F 17/3244* (2013.01); *A63F 3/0605* (2013.01); *A63F 3/081* (2013.01);
(Continued)

(58) Field of Classification Search
None
See application file for complete search history.

(56) References Cited

U.S. PATENT DOCUMENTS 6,758,754 B1 7/2004 Lavanchy et al.
7,337,458 B2 2/2008 Michelitsch et al.
(Continued)

OTHER PUBLICATIONS

Google Play, "Earn Prizes by Listening Free Music—Music Go!" retrieved from the Internet at https://play.google.com/store/apps/details?id=free.music.reward.download.song&hl=en_US&gl=US on Jan. 20, 2021, 3 pages.
(Continued)

*Primary Examiner* — Ronald Laneau
(74) *Attorney, Agent, or Firm* — Hamilton, Brook, Smith & Reynolds, P.C.

(57) ABSTRACT

A system for optimizing music listening which enables a player to earn game based electronic lottery tokens. A lottery game token music platform may be accessed via a mobile application or website from a client system. A player may earn electronic cryptographic raffle/lottery tickets/tokens by listening to sound recordings via the lottery game token music platform and/or watching videos containing sound. Analytics are processed based on the player's listening behavior, including statics regarding the player's consumption of the sound recordings, biometrics regarding the user's identity to verify that the user is not a bot, and listening engagement scores. In this way, tokens may be allocated based on how long the player listens to the song and other additional affirmative actions. Tokens earned by players are then placed into a raffle lottery to award cash prizes. A random number generator may be used to determine the lottery winners.

22 Claims, 6 Drawing Sheets

Related U.S. Application Data

(60) Provisional application No. 63/019,966, filed on May 4, 2020.

(51) Int. Cl.
*A63F 3/08* (2006.01)
*G06Q 20/38* (2012.01)
*G06Q 30/0207* (2023.01)

(52) U.S. Cl.
CPC ..... *G06Q 30/0225* (2013.01); *G07F 17/3255* (2013.01); *G07F 17/3258* (2013.01); *A63F 2003/082* (2013.01); *G06Q 20/389* (2013.01); *G06Q 2220/00* (2013.01); *G07F 17/3251* (2013.01)

(56) References Cited

U.S. PATENT DOCUMENTS

| | | | |
|---|---|---|---|
| 9,742,856 B2 | 8/2017 | Brandstetter et al. | |
| 9,959,711 B2 | 5/2018 | Kennedy | |
| 11,810,425 B1 | 11/2023 | Jones | |
| 2002/0010628 A1 | 1/2002 | Burns | |
| 2004/0204247 A1 | 10/2004 | Walker et al. | |
| 2004/0205065 A1 | 10/2004 | Petras et al. | |
| 2005/0060232 A1 | 3/2005 | Maggio | |
| 2006/0240890 A1 | 10/2006 | Walker et al. | |
| 2007/0067297 A1 | 3/2007 | Kublickis | |
| 2009/0210942 A1 | 8/2009 | Abel | |
| 2010/0064010 A1 | 3/2010 | Alkov et al. | |
| 2011/0295669 A1 | 12/2011 | Stiebel | |
| 2013/0124278 A1 | 5/2013 | Najm | |
| 2013/0205223 A1 | 8/2013 | Gilbert | |
| 2014/0058811 A1 | 2/2014 | Gorowitz et al. | |
| 2015/0310476 A1 | 10/2015 | Gadwa | |
| 2016/0171520 A1 | 6/2016 | Waters et al. | |
| 2018/0165700 A1 | 6/2018 | Onda et al. | |
| 2019/0042647 A1 | 2/2019 | Oh | |
| 2019/0325473 A1 | 10/2019 | Swamiddurai | |
| 2023/0040545 A1* | 2/2023 | Dorogusker | H04N 21/6125 |
| 2023/0241514 A1* | 8/2023 | Dalmia | A63F 13/69 463/40 |
| 2024/0214194 A1* | 6/2024 | Kapur | H04L 9/088 |

OTHER PUBLICATIONS

One More Cup Of Coffee, "Can You Really Make Money With HitPredictor?" retrieved from the Internet at https://onemorecupof-coffee.com/make-money-hitpredictor/, Dec. 18, 2019, 15 pages.
Non-Final Office Action for U.S. Appl. No. 16/882,032, titled "Methods And Systems For Tokenization Of Music Listening," consisting of 34 pages. Dated: May 13, 2022.
Notice of Allowance for U.S. Appl. No. 16/882,032, titled "Methods And Systems For Tokenization Of Music Listening," consisting of 10 pages. Dated: Jul. 19, 2023.

* cited by examiner

METHODS AND SYSTEMS FOR TOKENIZATION OF MUSIC LISTENING

RELATED APPLICATIONS

This application is continuation of U.S. application Ser. No. 16/882,032, filed on May 22, 2020, now U.S. Pat. No. 11,810,425 issued Nov. 7, 2023, which claims the benefit of U.S. Provisional Application No. 63/019,966, filed on May 4, 2020. The entire teachings of the above applications are incorporated herein by reference.

BACKGROUND

There are numerous platforms which make it possible to transmit a music stream to a user device to aid user listening. Music streaming services may enable digital music to be transmitted from a cloud system to a user device. Music downloading services may enable a user to download or add a music file to a user's music library. Some music streaming services and music downloading services provide analytics on a user/listener's interest of respective songs or artists. Music recommendations may be provided by the services in response to learning about what music a user likes.

SUMMARY

Music streaming platforms and digital music download services have benefited from unprecedented growth in an industry which many deemed was on the way out after the CD boom of the 1990s. The ability to make virtual recommendations to users about potential artists and songs to users has helped increase market share for the various stakeholders including the online service providers, the recording artists, and the record labels. The ability to provide recommendations has increased exposure for the artists, which in some cases has meant the difference between success and failure for the artist.

When it comes to streaming and digital music downloading platforms, success can depend on whether the platforms have successfully secured online music distribution and performance rights to vast music catalogues. For those platforms that have secured license rights to valuable music catalogues, they may be well positioned to successfully try and attract a broad customer base willing to purchase online music streaming contracts or subscriptions to download music.

However, even when a smart device, digital music platform, set top box, or satellite radio service transmits a song recommendation to a user, such technologies often struggle to actively measure the user's engagement. For example, it can be difficult to ensure that the user is actually listening to the recommended song.

To try to increase exposure, musicians have opted to digitally distribute some of their music library free of charge. While this may work well for an established artist, it is not often a successful means to increase the exposure or market share of a new artist that may not already have an established fan following. Likewise, even for established artists who would like to attract new fans, free distribution of portions of their library may not be significant enough of a marketing campaign to try to broaden their exposure to unfamiliar listeners. Even if a user downloads the free music, it still does not provide evidence that the user is actually listening to the music.

Concerts typically have been a proven way to promote music and try to ensure listener engagement. Concerts can be a successful approach to increase exposure for an artist's new songs. Concerts can also help increase the exposure of new artist should they be able to secure a coveted spot as the opening act for a more established artist. While concerts can help increase the exposure of a new artists as an opening act, there are limited opening act opportunities available for new artists. Further, emerging social distancing efforts, increased government regulations on large events, and increased costs can be obstacles to a successful concerts or festival.

It is desirable to find an effective approach to increase the exposure of music and musical artists with a large demographic of people.

Some embodiments of the invention provide a music listening platform that provides a user-friendly experience that ensures listener engagement across a large demographic of people.

One industry unrelated to the music industry, is the lottery. In an example lottery system, participants purchase tickets, each of which typically represents a chance to win a prize. In some cases, a portion of the revenue from ticket sales provides winning prize money. Many states have lotteries and the lotteries are exclusively run by the state. States often raise funds from lottery ticket sales.

It is desirable to find a technique for participants of a lottery to secure lottery tickets in via a more engaging and user-friendly way.

Some example embodiments of the invention can remedy such drawbacks by integrating a music listening system with an electronic lottery system.

Example embodiments of the invention can provide electronic lottery ticket system that creates a user-friendly experience that enables lottery participants to earn lottery tickets by engaging with an inventive digital music platform.

In some embodiments, a song lottery game action system is provided. The system may include a tokenized digital music platform. The tokenized digital music platform may be distributed across a computer network. The tokenized digital musical platform may engage in a session with client-side software that is designed to solicit and analyze player/listener feedback in real-time as sound signals are emitted. A signal processor of a user device, in communication with the digital music platform, may be arranged to activate a speaker unit via the user device to emit at least one sound source. The signal processor may change the conditions of the at least one sound source in response to a user engagement score.

The tokenized digital music platform may stream music and activate a feedback interface to engage a game player/music listener. As the song timeline progresses, the game player/music listener may be prompted at random intervals to provide feedback using the feedback interface in order to be eligible to receive a token. For example, the game player/music listener may indicate that she likes or dislikes a particular element of the song, such as an instrument, at a specific point in time. The feedback and challenge answers may be timestamped, processed, and processed by an analytics component of the tokenized digital music platform for analysis. Provided feedback may also be used for recommending subsequent songs to the game player/music listener. Further the game player/music listener may be required to complete a human verification system challenge. The tokenized digital music platform described herein may integrate with a variety of music streaming and digital music platforms.

In some embodiments, the tokenized music platform may use a random number generator (RNG) to randomly determine which of the game player/music listeners that have earned a certain threshold of tickets or earned a certain threshold engagement scores will actually receive a lottery award, token, sweepstakes or prize. In this way, the tokenized digital music platform is designed to translate a player's percentage of the amount listened to songs, level of engagement, and random selection to wager back to the player (RTP=return to player) over the course of many plays or instances of the songs. The RTP and randomness of the RNG are critical to ensuring the fairness of the songs listened to. Upon initiation of completion of the songs, the RNG randomly determines a reward selection outcome. Notably, the rewards actually allocated based on the volume tickets/tokens earned in response to the number of songs listened to by the user, can include an element of engagement on the part of the player and are therefore not entirely random.

An aspect of the invention relates to a music listening optimization system that includes server system operating a lottery game token music system. The server transmits an audio stream on different connected devices that emits sound emission to a user device and determines a liveliness test to ensure that the user actually listened. This is balanced with ease of play so there are different levels of engagements for the player.

In some embodiments, a player can log on to a mobile application or website and earn raffle/lottery tickets/tokens by listening to sound recordings and/or watching videos containing sound. Tickets may be earned based on a computation assessing how long the player listens to the song and other additional affirmative actions (e.g., liveliness tests) such as requiring player to assign a song rating and answering challenging about the song. Tickets earned by players may be thereby placed into a raffle lottery to award cash prizes. In this way, it pays to listen.

In one embodiment, players are presented with 4 10-song playlists per day in 3-hour blocks. Players can earn tickets to a cash drawing and a jackpot drawing by listening to songs. The players can earn:

1 ticket for listening to at least 30 seconds of a song
1 ticket for listening to at least half of the song
1 ticket for rating a song on a scale of 1-5 (note that it does not matter how the player rates the song, the act of rating the song itself will earn player the ticket so as not to influence the independent ratings of the users)

A total of 40 songs (4 10-song playlists) per day will be available to players for a total of 120 tickets earned per day.

At the end of each day, a raffle will be drawn awarding cash prizes to approximately 20 players per day (winning approximately ($250-1,000)

Players who earn at least one ticket on half of the songs per day will earn an entry into the end of the day Powerball-styled jackpot drawing with a minimum of $25,000 which will grow progressively if no one wins.

In one embodiment, a digital processing system is provided that includes:

a server interacting with a plurality of game players having respective computing devices executing a respective client app, the client apps including a first client, a second client, and an nth user at an nth device;
where each of the plurality of respective client apps interfacing with a respective connected account, each respective app interacting with audio media, the respective app having a meter measuring playback of the audio media and tracking engagement of the audio media of a respective player interfacing with the respective client;
a scoring engine computing an engagement score based on playback measurements and tracked engagement computations from the meter, the scoring engine computing an engagement score of the respective player,
a token engine computing whether the playback's engagement score meets a threshold, the token engine responding to a determination that the engagement score threshold is met by encoding at least one electronic token, and computing a token allocation based on the respective player's engagement score and the meter's playback measurements, the token allocation being allocated to the respective player's account, where the account is an electronic wallet in a blockchain network; and
an electronic asset award allocation being computed and distributed to a connected account of at least one of the plurality of game players.

The audio media may be at least one of: sound recordings and/or music videos containing sound. The tokens may be electronic tickets that are allocated based on an engagement computation assessing how long the player listens to the song and other additional affirmative actions (e.g., liveliness tests) such as requiring player to assign a song rating and answering challenging about the song. The electronic tokens/tickets may be cryptographic, and may be earned by players and placed into a raffle lottery to compute the award. The electronic token may be encoded via an encoder with the player's engagement score calculation, liveliness test results, and media file consumption scores. The electronic token may be unique to the player and perform at least one of: (i) automatic authentication of digital ownership of the token for the player; or (ii) enables asset interoperability across multiple lottery/award and crypto-gaming platforms; or (iii) enables purchasing of electronic lottery tickets. The tokens may be on block chain communication network accessible to the player via an electronic wallet.

The server may be a streaming sever that distributes at least one streaming audio or video stream to the respective client apps. The audio media may be at least one of: streaming audio, streaming video, downloaded audio, downloaded video. The server may communicate with a streaming service that is a third-party streaming service, and the third-party streaming service pairs with the respective user devices to facilitate playback of the audio media.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Digital Processing Environment

Figure 1A:
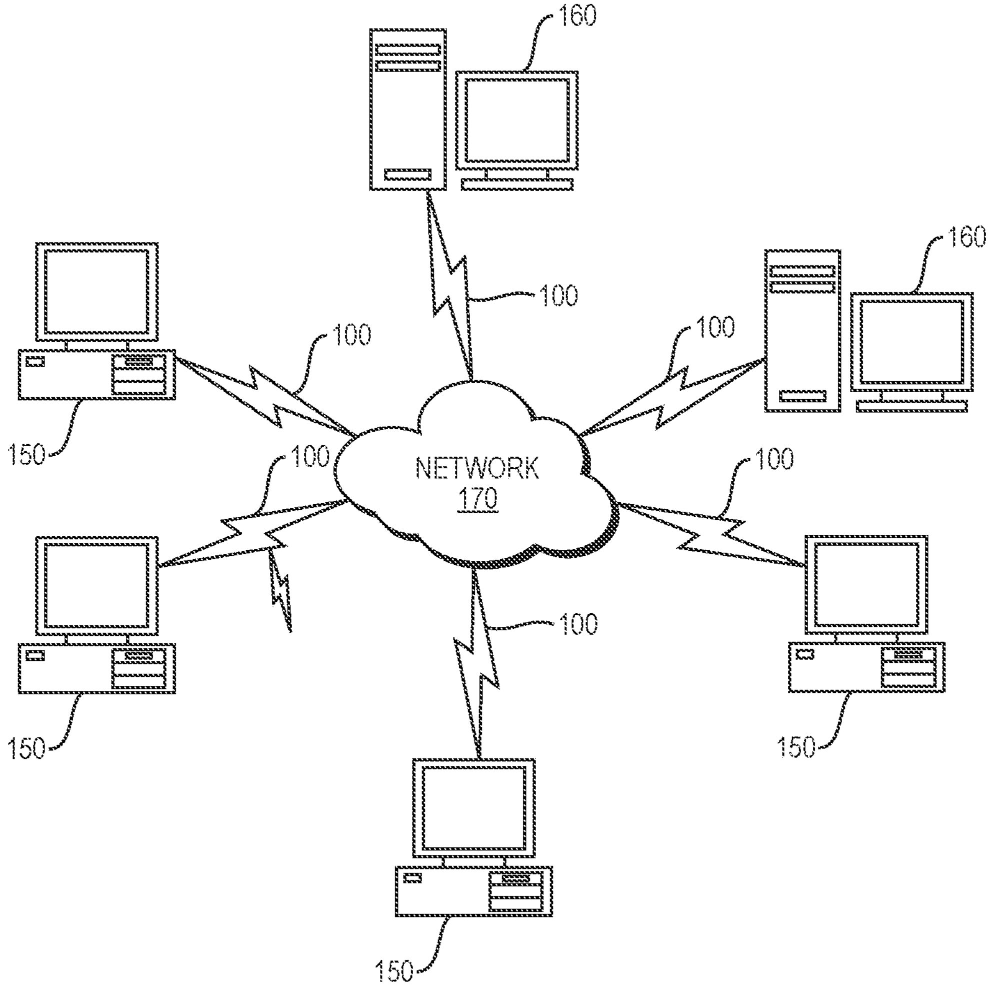
FIG. 1A is an example digital processing environment in which embodiments of the present invention may be implemented.

An example implementation of a system according to the invention for attesting to device health prior to engaging in transactions may be implemented in a software, firmware, or hardware environment. FIG. 1A illustrates one such example digital processing environment in which embodiments of the present invention may be implemented, such as the song lottery game action process. Client computers/devices 150 and server computers/devices 160 (or a cloud network 170) provide processing, storage, and input/output devices executing application programs and the like.

Client computers/devices 150 may be linked directly or through communications network 170 to other computing devices, including other client computers/devices 150 and server computer/devices 160. The communication network 170 can be part of a wireless or wired network, remote access network, a global network (i.e., Internet), a worldwide collection of computers, local area or wide area networks, and gateways, routers, and switches that currently use a variety of protocols (e.g. TCP/IP, Bluetooth®, RTM, etc.) to communicate with one another. The communication network 170 may also be a virtual private network (VPN) or an out-of-band network or both. The communication network 170 may take a variety of forms, including, but not limited to, a data network, voice network (e.g., land-line, mobile, etc.), audio network, video network, satellite network, radio network, and pager network. Other electronic device/computer networks architectures are also suitable.

Server computers 160 may be configured to provide a lottery game token music system (also referred to as the music listening optimization system) 200 (FIG. 2A) which communicates with authenticators to confirm a game player/music listener's identity prior to allowing the requestor to access resources protected by the lottery game token music system. The server computers may be part of a cloud network 170.

The sever computers 160 may be music streaming servers, and the client devices 150 may be streaming clients.

Figure 1B:
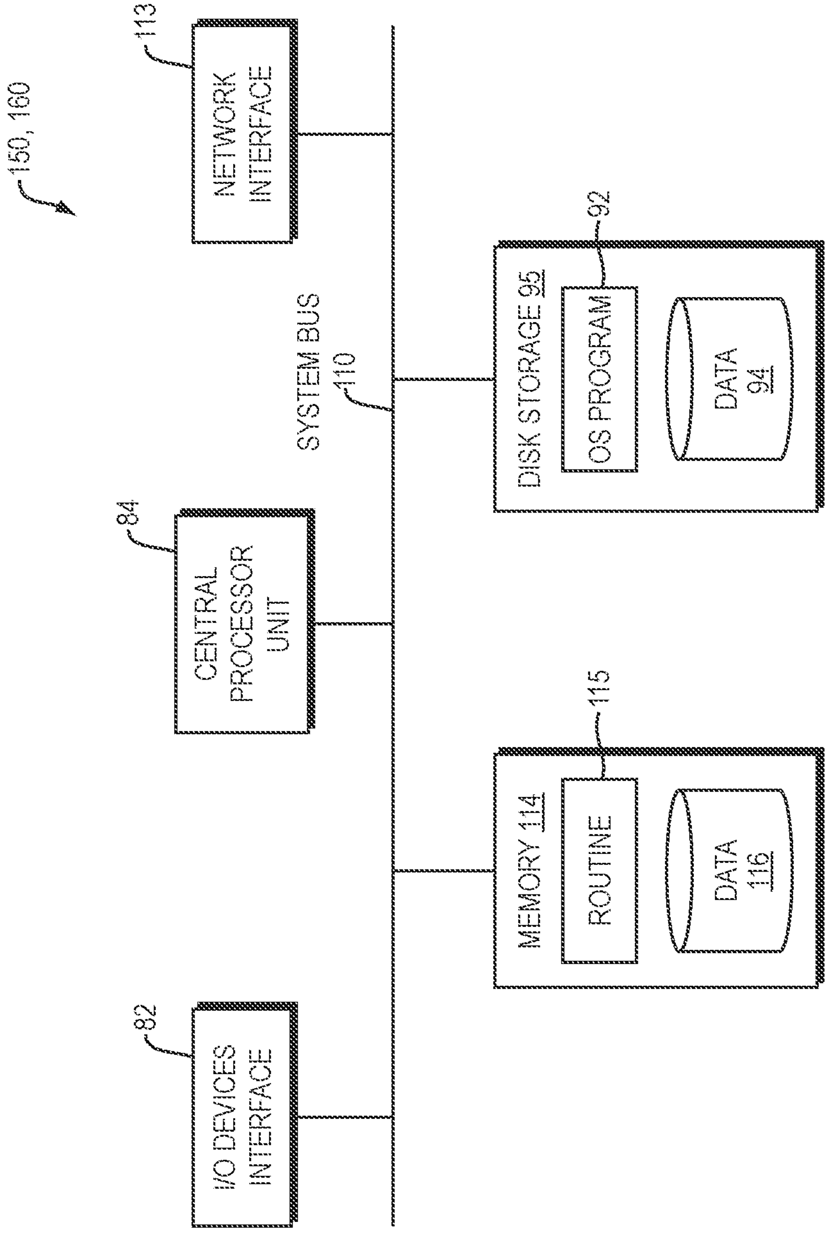
FIG. 1B is a block diagram of any internal structure of a computer/computing node.

FIG. 1B is a block diagram of any internal structure of a computer/computing node (e.g., client processor/device 150 or server computers 160) in the processing environment of FIG. 1A, which may be used to facilitate displaying audio, image, video or data signal information. Each computer 150, 160 in FIG. 1B contains a system bus 110, where a bus is a set of actual or virtual hardware lines used for data transfer among the components of a computer or processing system. The system bus 110 is essentially a shared conduit that connects different elements of a computer system (e.g., processor, disk storage, memory, input/output ports, etc.) that enables the transfer of data between elements.

Attached to the system bus 110 is an I/O device interface 111 for connecting various input and output devices (e.g., keyboard, mouse, touch screen interface, displays, printers, speakers, audio inputs and outputs, video inputs and outputs, microphone jacks, etc.) to the computer 150, 160. A network interface 113 allows the computer to connect to various other devices attached to a network (for example the network illustrated at 170 of FIG. 1A). Memory 114 provides volatile storage for computer software instructions 115 and data 116 used to implement software implementations of token/lottery ticket allocation via a music distribution system that includes, e.g., meter measuring player engagement, player identify attestation, player authentication, engagement scoring, playlists, online lottery, digital award system, and digital wallet components of some embodiments of the present invention. Such device-based lottery game token music system 200 software components 115, 116 (e.g. encoder 210, app 208, authentication site 206 of FIG. 2A) described herein may be configured using any programming language, including any high-level, object-oriented programming language, such as Python.

In an example mobile implementation, a mobile agent implementation of the invention may be provided. A client server environment can be used to enable mobile security services using the server 160. It can use, for example, the XMPP protocol to tether a device-based lottery game token music system engine/app/agent/client 115 on the device 150 to a server 160. The server 160 can then issue commands to the mobile phone on request. The mobile user interface framework to access certain components of the system 200 (FIG. 2A) may be based on XHP, Javelin and WURFL. In another example mobile implementation for OS X and iOS operating systems and their respective APIs, Cocoa and Cocoa Touch may be used to implement the client-side components 115 using Objective-C or any other high-level programming language that adds Smalltalk-style messaging to the C programming language.

The system may also include instances of server processes on the server computers 160 that may comprise an lottery game token music system 204 (FIG. 2), which allow registering a player, selecting authenticators/attesters for confirming the player is of age and in a permitted physical location to play the system 204, communicating with the authentications in regards to confirming a player's identity, a meter to measure the playback time of each song, and executing algorithms, such as statistical algorithms to compute engagement scores based on, among others, the metered song playback as well as interaction with the song, to allow or deny the requestor access to resources, tokens, and prizes protected and allocated by the system 204.

Disk storage 117 provides non-volatile storage for computer software instructions 115 (equivalently "OS program") and data 116 used to implement embodiments of the system 204. The system may include disk storage accessible to the server computer 160. The server computer can maintain secure access to records related to the authentication of players registered with the system 204. Central processor unit 112 is also attached to the system bus 110 and provides for the execution of computer instructions.

In an example embodiment, the processor routines 115 and data 116 are computer program products. For example, if aspects of the system 200 (FIG. 2A) may include both server side 160 and client side 150 components.

Figure 2A:
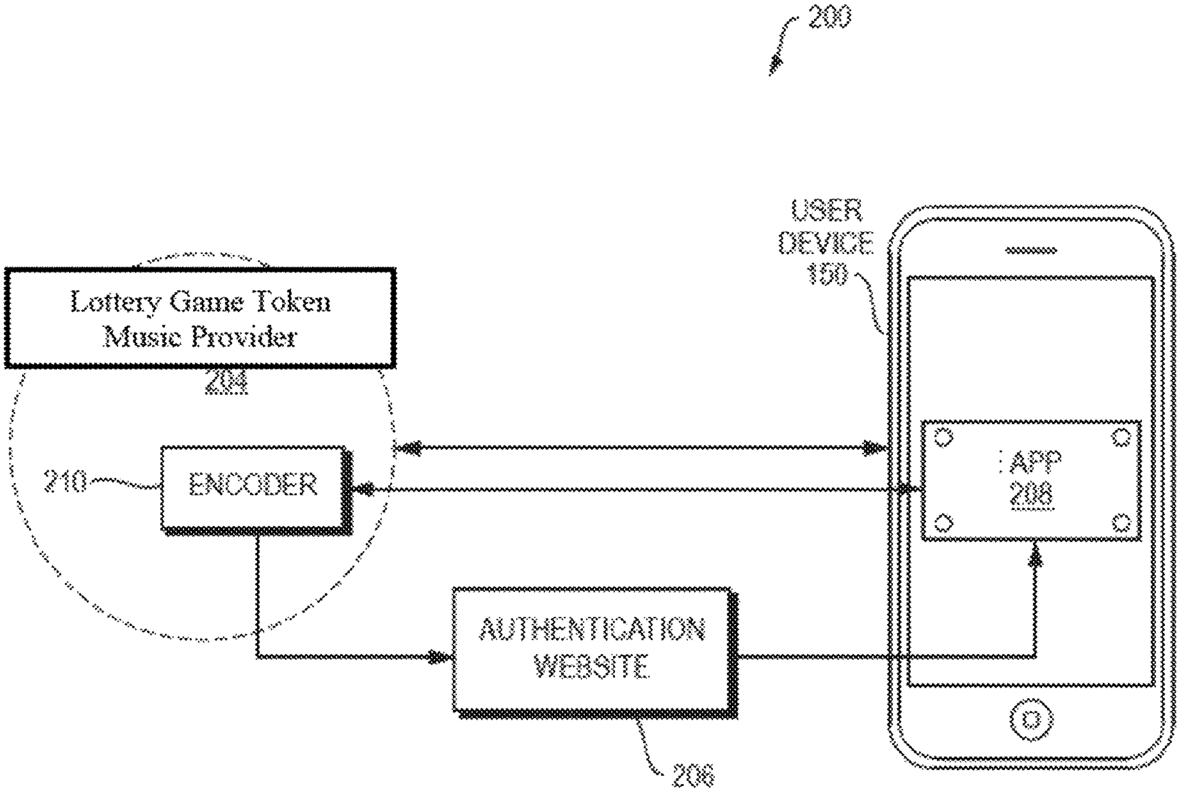
FIG. 2A is a block diagram showing an example device authentication system according to the invention.

In an example embodiment, authenticators/attesters to attest to a player's identity and age may be contacted via instant messaging applications, video conferencing systems, VOIP systems, email systems, etc., all of which may be implemented, at least in part, in software 115, 116. In another example embodiment, the meter engine that measures playback of songs, the engagement scoring engine, and the authentication engine/agent may be implemented as an application program interface (API), executable software component, or integrated component of the app 208 (FIG. 2A).

Software implementations 115, 116 may be implemented as a computer readable medium capable of being stored on a storage device 117, which provides at least a portion of the software instructions for the lottery game token music system 200. Executing instances of respective software components of the lottery game token music system 200, such as instances of the authentication engine, may be implemented as computer program products 115, and can be installed by any suitable software installation procedure, as is well known in the art. In another embodiment, at least a portion of the system software instructions 115 may be downloaded over a cable, communication and/or wireless connection via, for example, a browser SSL session or through an app (whether executed from a mobile or other computing device). In other embodiments, the lottery game token music system 200 software components 115, may be implemented as a computer program propagated signal product embodied on a propagated signal on a propagation medium (e.g., a radio wave, an infrared wave, a laser wave, a sound wave, or an electrical wave propagated over a global network such as the Internet, or other networks. Such carrier medium or signal provides at least a portion of the software instructions for the present user device authentication system 200 of FIG. 2A.

Certain example embodiments of the invention are based on the premise that online services may be significantly enhanced when a device can be trusted to be what it says it is and to execute instructions exactly as asked. A service provider generally has confidence in its servers because they are under administrative control and usually protected physically. However, nearly all of the service provider's services are delivered to users through devices the service provider knows very little about and over which it rarely exerts any control.

Through the use of Trusted Execution technology, certain inventive embodiments are able to provide a service provider with an oasis of trust in the unknown world of consumer devices. Basic capabilities such as "sign this", or "decrypt this" are executed outside the murky world of the main OS. Keys can be generated and applied without ever being exposed in memory and can be attested to through a chain of endorsements traced back to the device manufacturer.

Certain aspects of the invention enable trust in devices. Some embodiments operate on the fundamental premise that a reliable relationship with a device can make for a much safer, easier and stronger relationship with an end user. Achieving this requires knowing with confidence that a device involved in a current transaction is the same device it was in previous transactions. It also requires assurance that a device will not leak protected information if it is requested to perform sensitive operations such as decryption or signing.

One example preferred embodiment includes device code executed in the Trusted Execution Environment (TEE). The TEE preferably is a hardware environment that runs small applets outside the main OS. This protects sensitive code and data from malware or snooping with purpose-built hardware governed by an ecosystem of endorsements, beginning with the device manufacturer.

According to an embodiment, a player (e.g., gamer, listener, end user, app user) at a client system 150 may initiate a session using a mobile application or website 115 to the lottery game token music system 200 operating at a server system 160. A player may earn raffle/lottery tickets/tokens by listening to sound recordings via the lottery game token music system 200 and/or watching videos containing sound. Tokens (e.g., tickets) are earned are determined by how long the player listens to the song and other additional affirmative actions such as giving the song a rating. Tickets earned by players are then placed into a raffle lottery to award cash prizes.

Example Song Lottery Game Action Processes

Figure 3A:
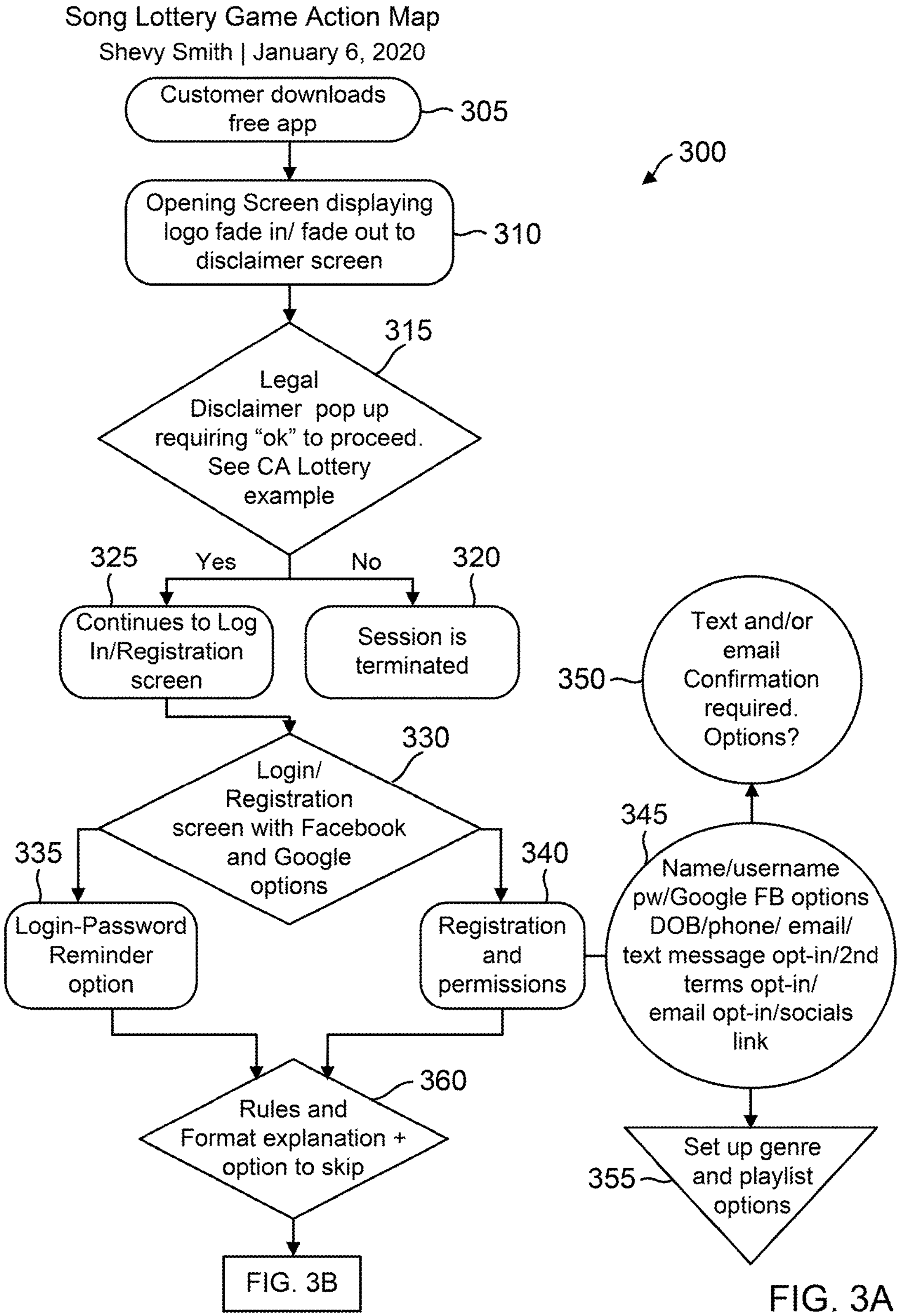
FIGS. 3A-3B is a flow diagram of a song lottery game action map according to an embodiment of the invention.
Figure 3B:
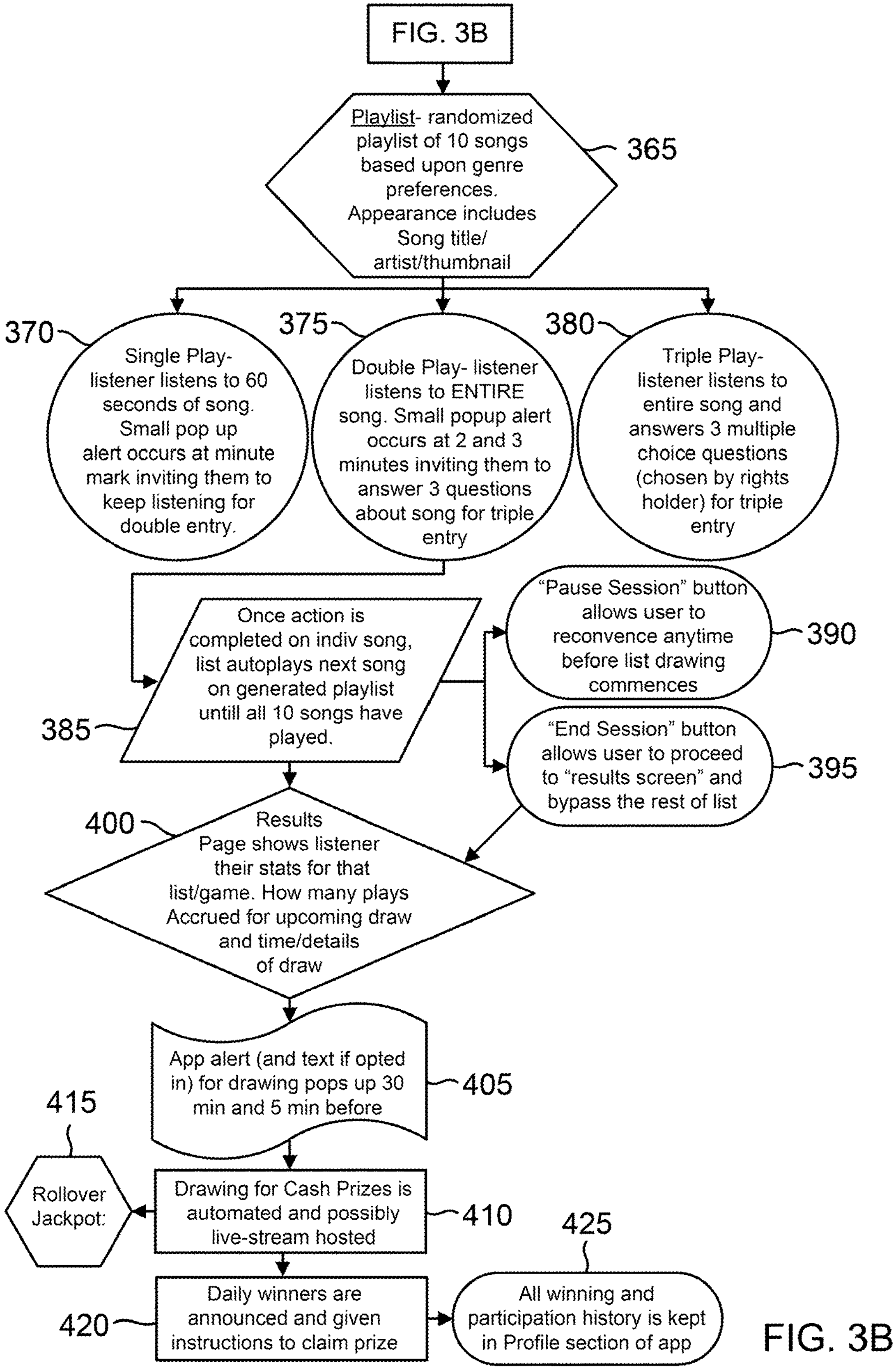

Referring to FIGS. 3A-3B, a song lottery game action process 300 is depicted according to an embodiment of the invention. At 305, the player downloads the app 208. At 310, an opening screen is displayed, and at 315 a disclaimer is displayed spec specifying that the game may be tethered to a specific geographical location. In this example, a geofencing protocol may be implemented to verify the physical location of the user's physical device 150. At 320, the session may be terminated with the server 160. For example, if the geofencing protocol or legal requirements are not properly approved by the system 200, the session can be terminated.

At 325, the session is approved, and the system proceeds to the authentication system 206. The user's credentials are checked at 330, preferably with multifactor verification processes. In addition, age verification may further be required. At 340, the registration and permission process are processed. If the user is being on-boarded, it may be processed via social media and other third-party systems to verify their identity at 345. The user's play list and music preferences may be initialed at 355. At 360, the rules of the game are provided, and at 365, the playlist is built including, for example, 10 randomized songs based on genre preferences. At options 370, 375, and 380 options for liveliness and biometrics tests may be provided to ensure user identify and ensure engagement with the user to facilitate calculation of the engagement score. In one example preferred embodiment, players may be presented with 4 10-song playlists per day in 3-hour blocks.

In an embodiment, at 370, a single play process is executed where the player listens to up to 30 seconds of a song. Small popup alerts may occur at a regular interval to invite them to keep listening for double entry.

In an embodiment, at 375, a double play process is executed in which the player listens to at least half of the song. Alerts occur at 2 and 3 minute intervals inviting the player to answer at least 3 questions about the song for triple entry.

In an embodiment, at 380, a triple play process is executed in which the player listens to the entire song and answers at least 3 multiple choice questions (chosen by the rights holder of the song) for triple entry.

The player may engage with the system using any one of or combination of the play process that the user selects (e.g., single, double, triple play processes) over the course of a few hours, days, or months.

A results page 400 may be provided that shows the analytics about the user's listening measurements. An engagement score may be provided to quantify the user's level of engagement based on the results of the double and triple play processes. The amount or length of songs listened to may be measured by a meter component.

At 405, an alert is executed indicating that a drawing for prizes will ensue in a specified amount of time. At 410, the drawing for cash prizes is computationally automated.

In one example, players can earn tickets to a cash drawing and a jackpot drawing by listening to the songs and having a high engagement score. For instance, a player may earn:

1 ticket for listening to 60 seconds of a song 1 ticket for listening to the whole song (80% of the song will be considered listening to the "whole" song)

1 ticket for rating a song on a scale of 1-5 (note that it does not matter how the player rates the song, the act of rating the song itself will earn player the ticket).

In an embodiment, a total of 40 songs (4 10-song playlists) per day will be available to players for a total of 120 tickets earned per day.

In an embodiment, at the expiration of each day, a raffle may be drawn awarding cash prizes to approximately 20 players per day (winning approximately ($250-1,000).

In an embodiment, players who earn at least one ticket on half of the songs per day will earn an entry into the end of the day Powerball-styled jackpot drawing with a minimum of $25,000 which will grow progressively if no one wins. In another embodiment, a random number generator (RNG) may be used to randomly select which of the game players meeting the threshold number of tickets will also receive a lottery award, token, sweepstakes or prize.

In one embodiment, the random number generator (RNG) is a device that generates a sequence of numbers or symbols that cannot be reasonably predicted better than by a random chance. The RNG can be implemented as a hardware random-number generators (HRNG) on the server. The HRNG can generate genuinely random numbers, or pseudo-random number generators (PRNG), which generate numbers that look random, but are actually deterministic.

In an embodiment, the RNG is based in software and generates random data to calculate the award based on random number tables. For example, the random number tables include large numbers of sufficiently random numbers that are collected using, for example, statistics from rolling dice, etc. Thus, results can be collected and distributed as random number tables, used to determine which players receive the award.

In an embodiment, the RNG uses computational methods for pseudo-random number generation via cryptography. In this way, cryptographically secure pseudo-random number generators (CSPRNG) may be used to determine the award winners.

In an embodiment, the RNG uses computer generated random numbers to determine the award winners, e.g., pseudorandom number generators (PRNGs) which are algorithms that can automatically create long runs of numbers with good random properties. The series of values generated by the algorithms are generally determined by a fixed number called a seed. For example, the PRNG is may be a linear congruential generator, which are well known in the art.

In an embodiment, the RNG generates a random number based on a probability density function. In this way, the RNG transforms a uniform random number. In one example, the inversion method is used, which integrates up to an area greater than or equal to the random number (which should be generated between 0 and 1 for proper distributions). In a second example, the acceptance-rejection method is used, which involves choosing an x and y value and testing whether the function of x is greater than the y value. If it is, the x value is accepted. Otherwise, the x value is rejected and the algorithm tries again.

At 420, the RNG determines the winners. In this way, daily winners may be announced and given instructions to claim their prize (e.g., tokens, reward, lottery tickets, etc.) At 425, all winning and participant history is maintained in a knowledgebase in a profile section of the app 115.

FIG. 2A is a block diagram showing an example implementation according to the invention, with components 200. With these system components 200, the client app 208 can communicate from a user device 205 through an application program interface (API) with the service 204. In addition, further services may be provided built on these system components 200 for token/ticket/reward management such as wallets, etc. To support this system, the registration of identity keys and a set of device management services for attestation of the player's identity, tokens/rewards earned, and wallet management are provided.

A blockchain structure may be used to support the management and ensure the integrity of the digital assets (e.g., the tokens, tickets, rewards) earned by the player. The blockchain system may be stored on the provider's server system 204 stored. In one preferred example, the user device will use a two-factor authentication application to access the wallet.

In one embodiment, the digital assets (tokens) may be fungible cyrptographic tokens and the at least one consumptive use may include using the fungible token to purchase electronic lottery tickets.

In one embodiment, the tokens may be a non-fungible cryptographic tokens (NFTs). The NFTs may be encoded via the encoder with smart contracts that authenticate the player and the player's listening history. For example, the player's engagement score calculation, liveliness test results, media file consumption scores, may be used to encode a non-fungible cryptographic token that is unique to the player. The NFTs can evidence digital ownership for the player and the enable asset interoperability across multiple lottery/award and crypto-gaming platforms. In one embodiment, the NFTs are computed as ERC-721 tokens in an Ethereum blockchain network. The NFTs may be used to purchase electronic lottery tickets.

In a preferred example embodiment, it would be the intent of the system not to maintain mission critical data as in conventional approaches, but rather to provide a platform for seamless yet very secure connections between lottery and song service providers 204 and players operating user devices 205. On one end of the system is the encoder 210 which prepares an instruction for a user device 205 and the other is the app 208 that can act on that instruction. A protocol according to an embodiment of the invention defines how these instructions and replies are constructed.

The app 208 preferably embodies the innovative binding between the song playback, analytics, user identify verification, and engagement scoring, and the allocation of tokens/rewards/tickets/prizes. The app 208 locks features of identity, geolocation, metering song playback, transaction and attestation to the hardware of the device 205.

Figure 2B:
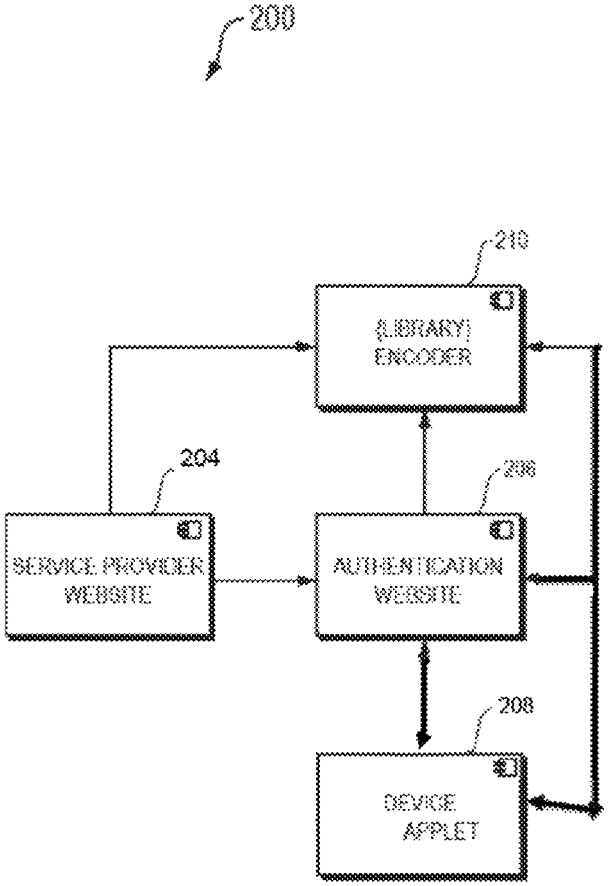
FIG. 2B is a diagram showing an example device authentication system according to the invention.

The system 200, according to an embodiment of the invention shown in FIG. 2B, may use a secure socket to maintain a persistent connection with all of the player's connected devices. This channel is used for pairing and other administrative functions. Library code may be provided to third parties and service providers for simplifying the construction distributing songs and signing of a tokens/rewards/tickets/prizes instruction. This library, for example, could be implemented in a programming language, such as an object-oriented, high-level programming language with dynamic semantics like Python.

In an example embodiment, the session with the server 160/service provider 204 may be maintained using a shared private key on top of a unique private key of the device 205. It should be noted; however, it is not typical to share a "private key", nor would it be desirable to have a long-lived shared symmetric key.

One aspect of the system according to an embodiment of the invention enrolls a device and equips it with a service provider's 204 keys. Inventive API's enable secure execution of a number of sensitive device-side transactions, including: getting a reliable and anonymous device id—on request, an embodiment of the invention will generate a signing key for a device. The public key is hashed into a string that can be used to identify and communicate with a device. The private key remains locked in the hardware and can only be applied on behalf of the service that requested the ID; getting a device to sign something—the private key of the device identity can be used to sign things proving that this particular device was involved. The signing ceremony is executed in secure hardware such that the key is never exposed to normal processing environment of the device; getting a device to encrypt something—an encryption key can be generated on request and applied to any blob of data.

The service provider 204 may call third party agent/processes, such as music streaming services and song downloads from online media sources to facilitate playback of songs at the user device 150. In one example embodiment, the app 208 will only respond to an instruction from the service provider 204 if it has been "paired" with the device 205, 150. The authentication web site 206 conducts the pairing ceremony as it is able to confirm the integrity and identity of both device 205, 150 and the service provider 160. When a device 205, 150 is paired it acquires the public key of the service provider 204, while the service provider gets a uniquely generated identity and public key for the device 205.

In an example embodiment, an authentication web Site 206 may be a JSON API written in Python, which uses the third party and lottery service provider's 204 private key to enroll the identity keys of devices 205. During enrollment, the public key of the user device 205 is recorded by the app 208. Enrollment enables the applet 208 to pair a device 205 with the service provider 204. The result of pairing is that a user device 205 has a service public key, endorsed by a third-party agent/process and can therefore respond to service provider 204 instructions.

The protocol according to an embodiment of the invention specifies the structure of an instruction and the signing/encryption that must be applied for the device 205 to accept the instruction. The instruction itself may, for instance, be prepared as a C structure that contains the instruction code, version data and payload. The entire structure preferably is signed by the service provider key and delivered to the device app 208 by calling a device local command.

In one embodiment, the lottery game token music system 200 may include liveness testing and biometrics testing to ensure the player's physical identify. For example, the lottery game token music system 200 may include liveness and biometric testing to ensure that the player is not a computational/automated bot that performs auto generation of click events.

In the past, user actions, such clicking on links, are valuable if the users performing these actions are people. However, these same actions are problematic if the users performing these actions are bots or spammers. Currently, servers combat bot traffic using defensive methods, such as blacklisting problematic IP addresses and examining packet data. However, it can be difficult for the system to know in advance which IP addresses are associated with automated bots.

To confirm that the player is not a bot in an example embodiment of the lottery game token music system 200, the system can use the authentication/decisioning system 206 to enable the player to verify their identify by ensuring that the player is speaking to the system live, rather than using a recording of a prior interaction or using an automated bot to interact with the system 200. For example, liveness testing system 114, 204 may request that the player repeat a specified phrase, or a lyric from a song that has been streamed to the player's device app 208, or instruct the player to perform a mouse or click event/touch screen action that could not have been previously recorded. The liveness testing system 114, 204 can verify, using automated speech recognition, that the player correctly repeated the phrase, and using biometrics technology, that the phrase was said by the registered player. The data from the biometric testing system and liveness system are processed by the authentication/decisioning system (e.g., oracle) 206 of the lottery game token music system 200, which determines whether the player has been successfully verified. Based on this verification, it may be determined that the player is actually listening to the streaming or downloaded music and therefore edible for an increase in engagement score calculation, and eligible for the award allocation.

The mobile application push notification pushes a notification to the player's registered mobile application. The mobile application 208 can interact with the player, and provide data for biometric testing and liveness testing via the authentication/decisioning system (oracle). Mobile application 208 may utilize voice biometrics, in one embodiment. In one embodiment, the mobile application 208 may additionally or alternatively use other forms of biometric identification, such as face and/or fingerprint. In one embodiment, the mobile application utilizes a data network to interact with the system. In one embodiment, the mobile application may allow interaction through a Voice-over-IP channel or through a cellular network channel, or through other means of transmitting the player's voice data.

While this invention has been particularly shown and described with references to example embodiments thereof, it will be understood by those skilled in the art that various changes in form and details may be made therein without departing from the scope of the invention encompassed by the appended claims.

For example, various embodiments are generally directed to systems and techniques to provide lottery services. In certain cases, the services are performed wirelessly. Accordingly, a system may be configured to offer and manage wireless lottery activities by allotting tickets in response to a player of the lotter game listening to songs or watching music videos.

It should be understood that although reference is made to tokens and lottery tickets, other kinds of awards may be earned by a player of the system 206. For example, awards may be earned related to wagering games such as slot games, video poker games, video blackjack games, roulette games, video bingo games, keno games and other types of games that are frequently offered at casinos and other locations. Play on EGMs typically involves a player establishing a credit balance by earning tokens or credit via song listening and song engagement, or another form of monetary credit, and placing a monetary wager (from the token/credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

What is claimed is:

1. A digital processing system comprising:

a tokenized digital music platform including:

a blockchain computer network having an encoder;

a plurality of game player computing devices;

a streaming server configured to transmit streaming data including audio media to the plurality of game player computing devices;

the tokenized digital music platform configured to be in network communication with the plurality of game player computing devices via a secure socket session to maintain a persistent network connection;

each of the plurality of game player computing devices respectively having a signal processor executing a client app and a digital wallet having a cryptographic token, encoded by the encoder, the signal processor being in communication with the tokenized digital music platform via the client app;

the signal processor interfacing with the digital wallet, the client app, and the streaming audio media, wherein the client app is configured to be tethered to a specific geographical location;

the tokenized digital music platform configured to verify via a geofencing protocol that a physical location of a respective game player computing device of the plurality of game player computing devices matches the specific geographical location tethered to the client app, and if requirement of the geofencing protocol are not verified, the tokenized digital music platform configured to terminate the secure socket session;

the client app configured to cause the signal processor to execute a meter configured to (i) measure playback of the streaming audio media to calculate a consumption score, and (ii) track engagement of a respective player interfacing with the streaming audio media;

the cryptographic token encoded with smart contracts configured to authenticate the playback of the streaming audio media measured by the meter and the consumption score; the tokenized digital music platform configured to execute a random number generator (RNG); and the tokenized digital music platform configured to allocate an electronic asset award allocation to at least one plurality of game player computing devices based on the cryptographic token authenticated consumption score and calculations from the random number generator (RNG).

2. The digital processing system as in claim 1 wherein the streaming audio media is at least one of: sound recordings and/or music videos containing sound.

3. The digital processing system as in claim 1 wherein the cryptographic token is further encoded to execute a liveliness test requiring configured to require the plurality of game player computing devices to assign a song rating and respond to challenges about the streaming audio media.

4. The digital processing system as in claim 1 wherein the electronic asset award includes tickets computationally processed by the RNG to create a raffle lottery award to be allocated.

5. The digital processing system as in claim 1 wherein the client app configured to cause the signal processor to execute a meter configured to (ii) track engagement of a respective player interfacing with the streaming audio media further includes the meter tracking the number of songs played at the game player computing device.

6. The digital processing system as in claim 5 wherein the meter determines if a threshold is met if 4-10 songs are streamed in a 3-hour block per day.

7. The digital processing system as in claim 1 wherein the media consumption is configured to include a confidence score that the player is not an automated bot.

8. The digital processing system as in claim 7 wherein the confidence score provides a confidence determination that the player is not an automated bot by using a biometrics test.

9. The digital processing system as in claim 7 wherein the cryptographic token is further encoded via the encoder with the liveliness test results.

10. The digital processing system as in claim 9 wherein the cryptographic token is unique and is configured to perform at least one of: (i) automatic authentication of the respective game player computing device; (ii) enables asset interoperability across multiple lottery/award and crypto-gaming platforms; and (iii) enables purchasing of electronic lottery tickets.

11. The digital processing system of claim 1 wherein the award is determined at the end of each day via raffle.

12. The digital processing system of claim 1 further including allocating the electronic asset award based on the consumption score and results from a random number generator (RNG) that randomly determines which of the plurality of game player computing devices receive an award.

13. The digital processing system of claim 1 wherein the digital wallet is a blockchain based wallet that stores electronic tokens and award allocations; and the streaming audio media is at least one of: streaming audio, streaming video, downloaded audio, downloaded video.

14. The digital processing system of claim 1 wherein the server communicates with a streaming service that is a third-party streaming service, and the third-party streaming service pairs with the plurality of game player computing devices to facilitate playback of the audio media.

15. The digital processing system of claim 1 wherein the connected accounts each correspond to respective digital wallets, such that a blockchain communication network hosts the digital wallet.

16. The digital processing system of claim 1 wherein the random number generator (RNG) is implemented as a hardware random-number generator (HRNG) on the tokenized digital music platform.

17. The digital processing system of claim 1 wherein the tokenized digital music platform is configured to require attestation that the electronic wallet of the respective game player computing device is digitally signed via a signature key without the signature key being exposed in memory of the respective game player computing device.

18. The digital processing system of claim 17 wherein the attestation is executed via a chain of endorsements traced back to a device manufacturer of the respective game player computing device.

19. The digital processing system of claim 17 wherein signature key is embedded in device code executed in a Trusted Execution Environment (TEE) of the respective game player computing device;

wherein the Trusted Execution Environment (TEE) of the respective game player computing device is configured as a hardware environment executing the device code outside an operating system of the respective player computing device.

20. A method of providing a tokenized digital music platform, the method comprising:

streaming data including audio media via a streaming server to a plurality of game player computing devices;

interfacing with the plurality of game player computing devices via a secure socket session to maintain a persistent network connection, each of the game player computing devices respectively having a signal processor executing a client app and a digital wallet having a cryptographic token encoded by an encoder;

tethering the client app to a specific geographical location;

verifying via a geofencing protocol that a physical location of a respective game player computing device of the plurality of game player computing devices matches the specific geographical location tethered to the client app;

terminating the secure socket session if the physical location of the respective game player computing device does not match the specific geographical location tethered to the client app;

measuring, via a meter, playback of the streaming audio media via the client app to calculate a consumption score;

tracking engagement of the respective game player computing device interfacing with the streaming audio media;

encoding the cryptographic token with smart contracts authenticating the playback of the streaming audio media measured by the meter and the consumption score;

executing a random number generator (RNG); and allocating an electronic asset award allocation to at least one of the plurality of game player computing devices based on the cryptographic token authenticated consumption score and calculations from the random number generator (RNG).

21. The digital processing system as in claim 5 wherein the client app executes a single play process at the gaming player computing device in response to detecting completion of a single play of at least 30 seconds of a song;

the single play process causing a user device popup alert process to occur at a regular interval at the gaming player computing device to alert the respective player to continue to listening for double entry of a jackpot award allocation.

22. A method of providing a tokenized digital music platform, the method comprising:

streaming data including audio media via a streaming server to a plurality of game player computing devices;

interfacing with the plurality of game player computing devices via a secure socket session to maintain a persistent network connection, each of the game player computing devices respectively having a signal processor executing a client app and a digital wallet having a token encoded by an encoder;

tethering the client app to a specific geographical location;

verifying via a geofencing protocol that a physical location of a respective game player computing device of the plurality of game player computing devices matches the specific geographical location tethered to the client app;

terminating the secure socket session if the physical location of the respective game player computing device does not match the specific geographical location tethered to the client app;

measuring, via a meter, playback of the streaming audio media via the client app to calculate a consumption score;

tracking engagement of the respective game player computing device interfacing with the streaming audio media;

encoding the token with smart contracts authenticating the playback of the streaming audio media measured by the meter and the consumption score;

executing a random number generator (RNG); and allocating an electronic asset award allocation to at least one of the plurality of game player computing devices based on the token authenticated consumption score and calculations from the random number generator (RNG).

* * * * *